US012602030B2

(12) United States Patent
Hayashi et al.

(10) Patent No.: US 12,602,030 B2
(45) Date of Patent: Apr. 14, 2026

(54) CONTROL DEVICE, CONTROL SYSTEM, CONTROL METHOD, AND COMPUTER-READABLE RECORDING MEDIUM

(71) Applicant: Yokogawa Electric Corporation, Tokyo (JP)

(72) Inventors: Shunsuke Hayashi, Tokyo (JP); Nobuaki Ema, Tokyo (JP); Yoshitaka Yoshida, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 495 days.

(21) Appl. No.: 18/218,679

(22) Filed: Jul. 6, 2023

(65) Prior Publication Data

US 2024/0012391 A1      Jan. 11, 2024

(30) Foreign Application Priority Data

Jul. 11, 2022      (JP) ................................. 2022-111401

(51) Int. Cl.
G05B 19/418          (2006.01)
(52) U.S. Cl.
CPC .................................. G05B 19/418 (2013.01)
(58) Field of Classification Search
CPC ........ G05B 19/418; G05B 2219/24187; G05B 19/0428; G05B 19/41865; G05B 2219/32252; G06F 11/002; G06F 11/1438; G06F 11/1441; G06F 11/1484; G06F 11/188; G06F 11/1641
See application file for complete search history.

(56) References Cited

U.S. PATENT DOCUMENTS

| | | | |
|---|---|---|---|
| 11,181,896 B2 | 11/2021 | Hayashi | |
| 2011/0010706 A1* | 1/2011 | Lambert | G06F 9/45558 718/1 |
| 2019/0250595 A1 | 8/2019 | Hayashi | |

FOREIGN PATENT DOCUMENTS

| | | | |
|---|---|---|---|
| JP | 2011-54114 A | 3/2011 | |
| JP | 2019139490 A | 8/2019 | |
| JP | 2020-27434 A | 2/2020 | |
| WO | WO-9844416 A1 * | 10/1998 | G06F 11/22 |

OTHER PUBLICATIONS

Japanese Office Action (JPOA) dated Jan. 21, 2025 for Japanese Patent Application No. 2022-111401; English machine translation.

* cited by examiner

*Primary Examiner* — Brian J. Sines
(74) *Attorney, Agent, or Firm* — RANKIN, HILL & CLARK LLP

(57)          ABSTRACT

In a control device, a selecting unit selects and outputs the arithmetic processing result based on the arithmetic processing results output from a plurality of controllers performing predetermined arithmetic processing. An application managing unit selects one or more of the controllers as target controllers for rebuilding; determines whether or not the reliability of the output of the selecting unit can be secured according to the arithmetic processing performed by the controllers other than the target controllers for rebuilding; and, when the reliability can be secured, carries out rebuilding of the target controllers for rebuilding.

14 Claims, 5 Drawing Sheets

FIG.4

CONTROL DEVICE, CONTROL SYSTEM, CONTROL METHOD, AND COMPUTER-READABLE RECORDING MEDIUM

CROSS-REFERENCE TO RELATED APPLICATION

The present application claims priority to and incorporates by reference the entire contents of Japanese Patent Application No. 2022-111401 filed in Japan on Jul. 11, 2022.

FIELD

The present invention relates to a control device, a control system, a control method, and a computer-readable recording medium.

BACKGROUND

In a variety of plant facilities in which petroleum oil, petrochemistry, chemistry, and gases are used; a variety of control such as the control for opening and closing of valves and the control for maintaining a constant temperature is performed by a control system. For that reason, the control system is demanded to secure the reliability according to the control target.

The functions of a control device are generally configured using hardware such as a central processing unit (CPU) and a memory, as well as using software such as a controller application. A controller application or a controller implies a control application and is hereinafter collectively referred to as a "controller". Meanwhile, in a control device, other applications other than the controller are also run. Such applications are sometimes referred to as "apps". Thus, the controller and the apps represent the applications.

In a control device, there are times when applications are run in a virtual environment of the hardware. In that case, a plurality of virtual machines (VMs) runs in the operating system (OS) or runs in virtual hardware; and applications run in each virtual machine. A virtual machine provides a virtual OS environment called a guest OS or a container.

In a control device, in case there is malfunctioning in either hardware or software, the operations get disrupted. In that regard, a control system has been proposed in which a plurality of controllers performs predetermined arithmetic processing and output arithmetic values; and a selecting unit selects a single output value from among the arithmetic values. As a result, the cost is held down while enhancing the reliability (Japanese Patent Application Laid-open No. 2020-27434).

Moreover, as far as software malfunctioning is concerned, sometimes a phenomenon called a memory leak occurs. In the case of a memory leak, for example, when a memory region acquisition request is issued to the OS, the memory does not get released due to a programming bug in an application. In case the memory leak occurs in a repeated manner, then there is a risk that the memory resources held in the OS dry up thereby causing instability in the OS and all applications running in the OS.

In that regard, for example, in a control system in which applications are run in a virtual environment, in order to resolve the unstable state attributed to a memory leak; virtual machines, such as guest OSs and containers, and applications are rebooted. However, if possible, it is desirable to ensure that no unstable operations occur during the period of time between the occurrence of a memory leak and rebooting. That is because, if an applications continue to perform unstable operations in an odd manner, then the operations performed by an inter-application interference preventing unit may not be enough to completely curb the influence of the unstable operations. In that regard, it is believed that, before any operation instability occurs due to a memory leak, if the applications are rebooted as preventive maintenance, the errors can be prevented from occurring.

As a technology for taking measures against a memory leak, a technology has been proposed in which the software that is responsible for a memory leak is rebooted; a plurality of processes providing services is implemented; and continuous implementation of the services is made possible even if some of the processes are rebooted (Japanese Patent Application Laid-open No. 2011-54114).

Depending on the state of the memory leak, there is a possibility that a plurality of applications is simultaneously rebooted. In that case, in the technology for selecting a single output value from among the arithmetic values obtained by a plurality of controllers, there is a risk that the selection cannot be appropriately made depending on the number of rebooted applications. In that regard, with the aim of avoiding a situation in which operation instability attributed to a memory leak occurs in a simultaneous manner, it has been proposed to intentionally vary the resource allocation to different values. However, it is difficult to accurately predict the degree of occurrence of memory leaks, thereby making it difficult to allocate resources in an optimal manner. Hence, it becomes difficult to avoid operation instability in the applications and to enhance the reliability of the control system.

In the technology in which a plurality of service providing processes is implemented before rebooting the software that is responsible for a memory leak, until the number of rebooted processes reaches a set count, it is difficult to provide highly reliable services. Moreover, in this technology, the process management is performed using a queuing unit. However, in the operations of a process control system in which real-time performance assumes significance, it is difficult to perform queue management; and there is a risk that the management performed by the queuing unit becomes complicated. For that reason, it becomes difficult to avoid operation instability in the applications and to enhance the reliability of the control system.

In the technology disclosed herein, it is an objective to provide a control device, a control system, a control method, and a computer-readable recording medium that enable avoiding operation instability in the applications and enable achieving enhancement in the reliability of the control system.

SUMMARY

It is an object of the present invention to at least partially solve the problems in the conventional technology.

According to an aspect of an embodiment, a control device includes, a selecting unit that selects and outputs an arithmetic processing result based on arithmetic processing results output from a plurality of applications performing predetermined arithmetic processing; and an application managing unit that selects one or more of the applications as target applications for rebuilding, determines whether or not reliability of output of the selecting unit is securable according to arithmetic processing performed by the applications other than the target applications for rebuilding, and when the reliability is securable, carries out rebuilding of the target applications for rebuilding.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a diagram illustrating an exemplary configuration of a control system according to a modification example of a first embodiment.

DESCRIPTION OF EMBODIMENTS

Figure 1:
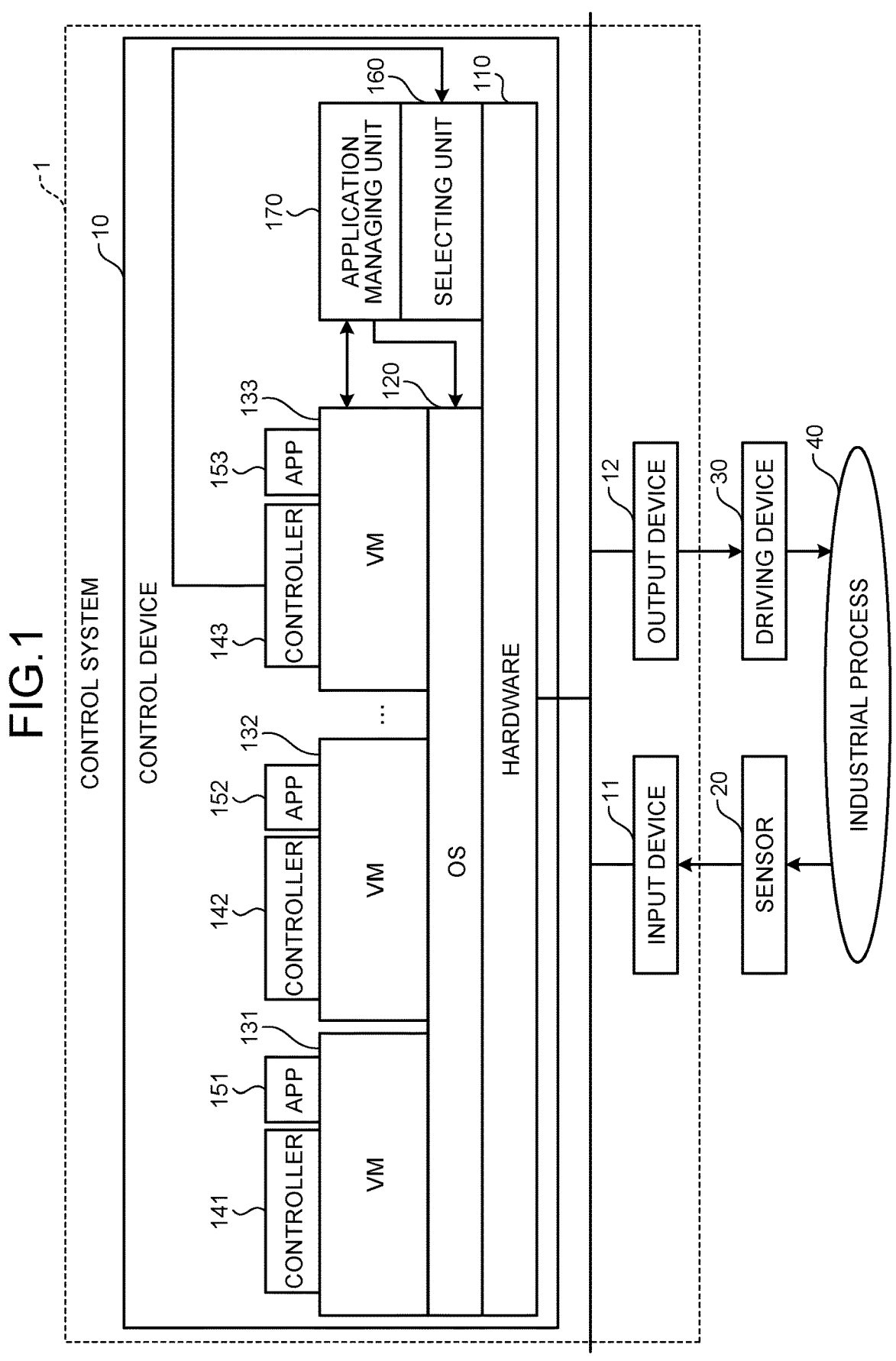
FIG. 1 is an exemplary schematic view of a control system.

Exemplary embodiments of a control device, a control system, a control method, and a computer-readable recording medium are described below in detail with reference to the accompanying drawings. However, the present invention is not limited by the embodiments described below. Moreover, identical constituent elements are referred to by the same reference numerals, and their explanation is not given repeatedly. Furthermore, the embodiments can be combined without causing any contradictions.

First Embodiment

Overall Configuration

FIG. 1 is an exemplary schematic view of a control system. A control system 1 illustrated in FIG. 1 is connected to a sensor 20 and a driving device (actuator) 30 via a network. The control system 1 is used in controlling, for example, an industrial process 40 of a plant facility. In the present written description, a plant facility implies an industrial plant related to chemistry; or a plant facility for managing and controlling a wellhead of a gas field or an oil field and the surrounding region; or a plant facility for managing and controlling electricity generation using hydraulic power/thermal power/nuclear power; or a plant facility for managing and controlling energy harvesting using the solar light or the wind power; or a plant facility for managing and controlling water supply and sewage systems and dams.

The sensor 20 is installed in the industrial process 40 for the purpose of measuring a physical quantity in the industrial process. The sensor 20 sends the physical quantity, which is to be measured, in the form of a measurement signal to an input device 11 of the control system 1 via a network. In the present written description, for example, the sensor 20 can be a sensor device such as a manometer, a flowmeter, or a temperature sensor; or can be a microphone that collects the abnormal noise generated in the plant facility; or can be a position detection device that outputs position information of each device or can be an imaging device such as a camera or a video recorder that takes images of the condition and the objects in the plant object.

When the input of a control signal is received from an output device 12, the driving device 30 drives the industrial process 40 according to the control signal. Moreover, the driving device 30 includes a valve device such as a flow control valve or an opening-closing valve, and includes an acoustic device such as a speaker that outputs the operation sounds of fans and motors as well as outputs warning sounds.

As illustrated in FIG. 1, the control system 1 includes a control device 10, an input device 11, and an output device 12. The control device 10 is connected to the input device 11 and the output device 12 via a network.

The input device 11 receives the input of a measurement signal from the sensor 20. Then, the input device 11 sends the received measurement signal to the control device 10.

The output device 12 receives a control signal that is sent from the control device 10. Then, the output device 12 outputs the received control signal to the driving device 30. The driving device 30 operates the industrial process 40 according to the control signal. Meanwhile, the input device 11 and the output device 12 can be configured in an integrated manner as far as the hardware is concerned.

Configuration of Control Device

Based on the measurement signal input from the input device 11, the control device 10 performs predetermined arithmetic processing (calculation), and outputs a control signal corresponding to the result of arithmetic processing to the output device 12 via the network. The control device 10 is configured using, for example, a computer device. The control device 10 can be included in a distributed control system (DCS). Herein, regarding the measurement signal input from the input device 11, the control device 10 performs arithmetic processing according to a predetermined algorithm and generates a control signal. The functions of the control device 10 are implemented using hardware 110 including a CPU and a memory; and using software including an OS 120, virtual machines 131 to 133, controllers 141 to 143, and application(APP)s 151 to 153. In the following explanation, when the virtual machines 131 to 133 need not be distinguished from each other, they are collectively referred to as virtual machines 130. Similarly, when the controllers 141 to 143 need not be distinguished from each other, they are collectively referred to as controllers 140. Moreover, when the applications 151 to 153 need not be distinguished from each other, they are collectively referred to as applications 150.

As far as the control device 10 is concerned, instead of taking measures after the occurrence of operation instability in the controllers 140 due to a software error such as a memory leak, the control device 10 performs a rebuilding operation for rebuilding the controllers 140 before there is any adverse effect, and thus avoids the occurrence of operation instability. In this way, rather than suppressing the effect of the controllers 140 having operation instability, rebuilding the controllers 140 in a planned manner makes it easier to eliminate the overall adverse effect of a software error.

At the time of rebuilding the controllers 140, since a selecting unit 160 of the control device 10 continues to select the correct output value, the control device 10 performs control in such a way that the number of controllers that are running is equal to or greater than the number of controllers 140 that enable securing the reliability of the control system 1 during the rebuilding operation. Moreover, the control device 10 guarantees the reliability of the control system 1 by carrying out the rebuilding, such as rebooting and reinstallation, of the controllers 140 according to a simple mechanism explained below. Given below is the detailed explanation of the control device 10.

The control device 10 runs the OS 120 in the hardware 110. For example, when the virtual machines 130 function as guest OSs, the OS 120 functions as the host OS. When an instruction for booting the virtual machines 130 and the controllers 140 is newly received from an application managing unit 170, the OS 120 newly boots the virtual machines 130 and the controllers 140.

The control device 10 runs a plurality of virtual machines 131 to 133 in the OS 120. The virtual machines 130 are guest OSs or containers. The virtual machines 131 to 133 run the controllers 141 to 143, respectively, and run the applications 151 to 153, respectively.

Moreover, each virtual machine 130 predicts that the time is getting near till the operations of the corresponding controller 140 become affected due to the occurrence of a software error. That is, each of a plurality of virtual machines 130 runs the corresponding controller 140, which is an individual application for performing predetermined arithmetic processing, and predicts the occurrence of malfunctioning in that controller 140.

For example, as a result of detecting an increase in its memory usage, each virtual machine 130 predicts that the time is getting near till the operations of the corresponding controller 140 become affected. Meanwhile, examples of a software error also include operation instability attributed to the implementation of a security patch in the OS 120. Meanwhile, each virtual machine 130 can also predict that the time is getting near till the operations of the corresponding controller 140 become affected due to the occurrence of a soft error such as a bit error attributed to cosmic radiation. Although the following explanation is given with reference to a software error, the same explanation is applicable regarding a soft error too. In the following explanation, predicting the fact that the time is getting near till the operations of the corresponding controller 140 become affected due to the occurrence of a software error is referred to as "predicting a software error".

Meanwhile, there is no particular restriction on the method by which the virtual machines 130 predict a software error. For example, if the temperature of the central processing unit (CPU) remains above a threshold value for a certain period of time or beyond, then each virtual machine 130 predicts a software error. Other than that, each virtual machine 130 can predict a software error according to the operating time of the control device 10, or according to the operating time of the applications including the controller 140, or according to the number of operation steps. Moreover, each virtual machine 130 can predict a software error by implementing any one of those methods or by combining a plurality of methods.

When a software error is predicted, the concerned virtual machine 130 treats the corresponding controller 140 as the target for rebuilding and issues a rebuilding request regarding that controller 140 to the application managing unit 170. Subsequently, when a rebuilding instruction is received from the application managing unit 170, the virtual machine 130 rebuilds the controller 140.

Herein, as long as the arithmetic processing function of the controller 140 can be restored after being stopped once, the rebuilding of the controller 140 can be performed according to any arbitrary method. That is, the rebuilding of the controller 140 includes rebooting of the virtual machine 130 that runs the concerned controller 140; post-shut-down booting of the virtual machine 130; and reinstallation of the virtual machine 130. Herein, post-shut-down booting of the virtual machine 130 is different than mere rebooting thereof, and implies shutting down the virtual machine 130 and then booting it. In that case, the information stored in the memory gets completely erased. In the case of reinstalling the virtual machine 130, there is a restart of the virtual machine 130 and the controller 140 from the initial state. Herein, the controller 140 represents an example of an "application". That is, the "rebuilding of an application" implies the operations such as rebooting, post-shut-down booting, and reinstallation that are performed with the aim of restoring the arithmetic processing functions of the application after they have been stopped. Moreover, the rebooting of the controller 140 due to the rebooting of the virtual machine 130 and the post-shut-down booting of the controller 140 due to the post-shut-down booting of the virtual machine 130 represent examples of "shutting down and booting".

Moreover, the control device 10 runs the controller 140 and the application 150 in each virtual machine 130. The application 150 is an application other than the controller 140. In the first embodiment, the control device 10 includes three pairs of the virtual machine 130 and the controller 140. The application 150 can be configured to control the timing of outputting the value calculated by arithmetic processing by the controller 140.

The controller 140 receives, via the input device 11, the measurement signal input from the sensor 20. Then, based on the measurement signal input from the sensor 20, the controller 140 calculates the value that should be applied to the driving device 30. That is, the controller 140 is an application that performs predetermined arithmetic processing for calculating a control value with respect to the industrial process 40. For example, regarding the input measurement signal, the controller 140 performs arithmetic processing according to a predetermined algorithm and outputs an arithmetic processing result. Herein, the controller 140 performs identical-control arithmetic processing. In identical-control arithmetic processing, when the input value is the same and when correct arithmetic processing is performed, the exact same arithmetic processing result gets calculated.

The control device 10 also includes the selecting unit 160 that runs in the hardware 110. In the first embodiment, the explanation is given about the case in which the selecting unit 160 runs in the hardware 110. Alternatively, the selecting unit 160 can run in the OS 120. In the first embodiment, the selecting unit 160 is configured using software. Thus, for example, the selecting unit 160 can be built as dedicated firmware in the hardware 110.

The selecting unit 160 manages the operations of the controllers 140. When a request is received from the application managing unit 170, the selecting unit 160 notifies the application managing unit 170 about the total number of controllers 140 that perform identical-control arithmetic processing.

Moreover, the selecting unit 160 receives, from each controller 140, the input of an arithmetic value calculated by that controller 140. In FIG. 1, for illustrative purposes, a communication route extending from the controller 143 to the selecting unit 160 is illustrated. In an identical manner, a communication route extends from each other controller 140 to the selecting unit 160.

The selecting unit 160 selects the output value based on the arithmetic values calculated by the controllers 140. More particularly, the selecting unit 160 selects one of the arithmetic values, which are output from the controllers 140, as the output value. Then, the selecting unit 160 outputs a control signal, which is based on the selected output value, to the output device 12. When that control signal is sent to the driving device 30, the industrial process 40 is implemented by the driving device 30 according to the control signal. In this way, the selecting unit 160 selects and outputs such an arithmetic processing result which is output based on the arithmetic processing result obtained by each of a plurality of controllers 140 that performs predetermined arithmetic processing for calculating the control value with respect to the industrial process 40.

For example, the following explanation is given about the case in which the sensor 20 is configured to measure the flow rate and in which the driving device 30 is attached to a pipe and is configured using an actuator that adjusts the degree of opening of the valve meant for controlling the flow rate of the fluid flowing through the pipe. In that case, a signal about the information related to the flowrate measured by the sensor 20 is input to the control device 10. The selecting unit 160 obtains, as the arithmetic values, the result of arithmetic processing performed for computing the value to be output to the actuator based on the information related to the flowrate obtained by each controller 140. Then, the selecting unit 160 selects one of the obtained arithmetic values as the output value. Subsequently, the selecting unit 160 outputs a control signal based on the selected output value to the output device 12. When the driving device 30 receives the control signal, the flowrate of the fluid flowing through the pipe is adjusted based on the output value.

Regarding the operation by which the selecting unit 160 selects the arithmetic value, the more detailed explanation is given below. From among the arithmetic values output from the controllers 140, the selecting unit 160 selects, as the output value, an arithmetic value according to the majority logic. That is, from among the arithmetic values output from the controllers 140, the selecting unit 160 selects, as the output value, the same value that is output for the highest number of times. Alternatively, from among the arithmetic values output from the controllers 140, the selecting unit 160 selects, as the output value, the same value that is output from half or more of the controllers 140. Herein, the same value need not be exactly identical, and can be treated to be same within a predetermined tolerance range. As the tolerance range, for example, it is desirable that an appropriate range such as within ±1% is set according to the operation. Moreover, if a plurality of arithmetic values is present within the tolerance range, then the selecting unit 160 can calculate the average value of those arithmetic values and output the average value as the output value. Alternatively, if three or more arithmetic values are present within the tolerance range, then the selecting unit 160 can calculate the median value and output it as the output value. In this way, as long as a representative value of a plurality of arithmetic values present within the tolerance range can be output as the output value, the selecting unit 160 can decide on the output value according to some other method too.

For example, if there are three controllers 140, the selecting unit 160 obtains the arithmetic value output from each of the three controllers 140. Herein, the explanation is given about the case in which two of those controllers 140 output the same arithmetic value, and the remaining controller 140 outputs a different arithmetic value. In that case, since the arithmetic value output by two controllers 140 is the arithmetic value output for the highest number of times, the selecting unit 160 selects that arithmetic value as the output value.

As a result of selecting a single output value according to the majority logic from among the arithmetic values input from the controllers 140, even if malfunctioning occurs in some of the virtual machines 130 or some of the controllers 140, it still becomes possible to output the arithmetic value that can be considered to be normal. Hence, the control device 10 can continue to output the output value that can be considered to be normal, and can drive the driving device 30 in a normal manner. However, in order to secure the reliability about the fact that the selecting unit 160 obtains the arithmetic value that can be considered to be normal, it is desirable that the number of running controllers 140 is equal to or greater than the minimum number of controllers 140 required for enabling securing the reliability according to the majority logic.

Moreover, the selecting unit 160 manages the total number of controllers 140 and manages the number of controllers 140 that perform identical-control arithmetic processing. When an output from a new controller 140 is received, the selecting unit 160 increments, by one, the number of controllers 140 to be made to perform identical-control arithmetic processing. On the other hand, if malfunctioning is detected in any controller 140 according to the comparison of the values, then the selecting unit 160 decrements, by one, the number of controllers 140 to be made to perform identical-control arithmetic processing.

The control device 10 also includes the application managing unit 170 that runs in the hardware 110. In FIG. 1, the selecting unit 160 and the application managing unit 170 are illustrated to be separate units. However, alternatively, the application managing unit 170 can be included in the selecting unit 160 as one of the functions.

The application managing unit 170 manages the operation states, such as the in-execution state and the stopped state, of the applications including the virtual machines 130 and the controller 140. Moreover, the application managing unit 170 issues operation instructions such as booting, stopping, and rebooting of the virtual machines 130. Furthermore, at the time of rebuilding the controllers 140, the application managing unit 170 determines whether or not the rebuilding is possible and, if the rebuilding is possible, ensures that the controllers 140 are rebuilt.

More particularly, when a notification about the prediction of a software error is received from any virtual machine 130, the application managing unit 170 determines whether or not it is possible to rebuild the controller 140 run by that virtual machine 130. Moreover, when the state of the virtual machines 130 or the controllers 140 satisfies a predetermined condition, the application managing unit 170 determines whether or not it is possible rebuild the controllers 140 run by such virtual machines 130 which have satisfied the predetermined condition or whether or not it is possible to rebuild the controllers 140 that have satisfied the predetermined condition. Herein, satisfying the predetermined condition implies, for example, the case in which the operating time of the concerned virtual machine 130 exceeds a predetermined period of time.

Meanwhile, depending on the system environment, the application managing unit 170 can vary the criterion for identifying the rebooting target based on the predetermined condition. For example, depending on the memory size assigned to each virtual machine 130, the application managing unit 170 varies the operating time representing the determination criterion for treating a particular controller 140 as the target for rebuilding. That is, the application managing unit 170 multiplies the size of the installed memory with a coefficient and calculates the operating time representing the determination criterion under a predetermined condition. For example, if the memory size of 4 GB is allocated to the virtual machines 130, then the application managing unit 170 calculates the operating time, which represents the determination criterion under a predetermined condition, as 4×(1 day)=(4 days). Alternatively, if the memory size of 8 GB is allocated to the virtual machines 130, then the application managing unit 170 calculates the operating time, which represents the determination criterion under a predetermined condition, as 8×(1 day)=(8 days).

When a rebuilding request is received from any virtual machine 130 or when the application managing unit 170 itself decides on the target controller 140 for rebooting, the application managing unit 170 performs the following determination operation for determining whether or not it is possible to perform rebuilding. Given below is the detailed explanation of the determination operation performed by the application managing unit 170 to determine whether or not it is possible to perform rebuilding.

The application managing unit 170 obtains, from the selecting unit 160, the total number of controllers 140 that perform identical-control arithmetic processing. Then, the application managing unit 170 subtracts the number of target controllers 140 for rebuilding from the total number of controllers 140 that perform identical-control arithmetic processing, and calculates the number of controllers 140 that run during the rebuilding and perform identical-control arithmetic processing. In the following explanation, the controllers 140 that run during the rebuilding and perform identical-control arithmetic processing are called the "controllers 140 that run during the rebuilding". Then, according to the controllers 140 that run during the rebuilding, the application managing unit 170 determines whether or not it is possible to secure the reliability of the control system 1. Herein, securing the reliability of the control system 1 implies being able to secure the reliability about the fact that the selecting unit 160 selects the arithmetic value considered to be correct according to the majority logic. Thus, if the reliability of the control system 1 can be secured, the control device 10 can drive the driving device 30 in a normal manner.

For example, if the number of controllers 140 that run during the rebuilding is equal to or greater than half of the original total number of the controllers 140 that perform identical-control arithmetic processing, then the application managing unit 170 determines that it is possible to secure the reliability of the control system 1. Herein, the explanation is given about a case in which a total of five controllers 140 perform identical-control arithmetic processing. If there is one target controller 140 for rebuilding, then the application managing unit 170 determines that the reliability of the control system 1 can be secured because of the fact that the number of controllers 140 that run during the rebuilding is equal to four, which is equal to or greater than half of the original total number of controllers 140. In contrast, if there are three target controllers 140 for rebuilding, then the application managing unit 170 determines that the reliability of the control system 1 is difficult to secure because of the fact that the number of controllers 140 that run during the rebuilding is equal to two, which is smaller than half of the original total number of controllers 140.

If it is determined that the reliability of the control system 1 can be secured, then the application managing unit 170 determines that it is possible to carry out the rebuilding of the target controller 140 for rebuilding. Then, to virtual machine 130 that runs the target controller 140 for rebuilding, the application managing unit 170 issues an instruction to rebuild the corresponding controller 140. That is, the application managing unit 170 treats one or more controllers 140 as the target controllers for rebuilding; determines whether or not the arithmetic processing performed by the controllers 140 other than the target controllers 140 for rebuilding enable securing the reliability of the output value selected by the selecting unit 160; and, if the reliability can be secured, carries out the rebuilding of the target controllers 140 for rebuilding. Moreover, based on the operation state of the virtual machines 130 and the controllers 140, the application managing unit 170 determines whether or not to rebuild each controller 140; determines whether or not the reliability can be secured with the arithmetic processing performed by the controllers 140 other than the target controllers 140 for rebuilding; and, if the reliability can be secured, carries out the rebuilding of the target controllers 140 for rebuilding.

On the other hand, if it is determined that the reliability of the entire control system 1 cannot be secured, then the application managing unit 170 defers the rebuilding for a specific redetermination standby period. For example, the redetermination standby period can be set to one minute. After the elapse of the redetermination standby period, the application managing unit 170 again determines whether or not it is possible to carry out the rebuilding.

In the case of repeating the determination about whether or not it is possible to carry out the rebuilding, the application managing unit 170 determines whether or not a specific upper limit period has elapsed. For example, the upper limit period can be set to five minutes. If the rebuilding cannot be carried out even after the elapse of the upper limit period, then the application managing unit 170 instructs the OS 120 to boot a new virtual machine 130 and a new controller 140. Then, after the number of new controllers 140 has increased, the application managing unit 170 obtains, from the selecting unit 160, the total number of controllers 140, including the new controller 140, that perform identical-control arithmetic processing. Subsequently, using the newly-obtained total number of controllers 140, the application managing unit 170 again determines whether or not it is possible to carry out the rebuilding.

The determination logic, which is implemented by the application managing unit 170 to determine whether or not it is possible to carry out the rebuilding, is variable depending on the reliability required from the identical-control arithmetic processing performed by the concerned controllers 140. For example, in the manner explained below, the application managing unit 170 can vary the determination logic for determining whether or not it is possible to perform the rebooting. That is, when the identical-control arithmetic processing performed by the controllers 140 is required to have a high degree of reliability, if the number of running controllers 140 is equal to or greater than half (i.e., a state in which three out of five controllers 140 are running), the application managing unit 170 determines that the reliability of the entire control system 1 can be secured and rebooting is to be performed. On the other hand, when the identical-control arithmetic processing performed by the controllers 140 is not required to have a high degree of reliability, as long as a plurality of controllers 140 is running (i.e., a state in which two out of five controllers 140 are running), the application managing unit 170 determines that the reliability of the entire control system 1 can be secured and rebooting is to be performed.

Alternatively, regarding the controllers 140 that run during the rebuilding, the application managing unit 170 can additionally set the minimum count of three or more, and accordingly determine whether or not it is possible to perform the rebooting. However, greater the number of controllers 140 that run during the rebooting, that is, three rather than two or four rather than three, the more is the possibility that the selecting unit 160 eventually selects the correct output. In that regard, regarding the controllers 140 that run during the rebuilding, it is desirable that the minimum count is set in accordance with the operating status.

Rebuilding Operation

Figure 2:
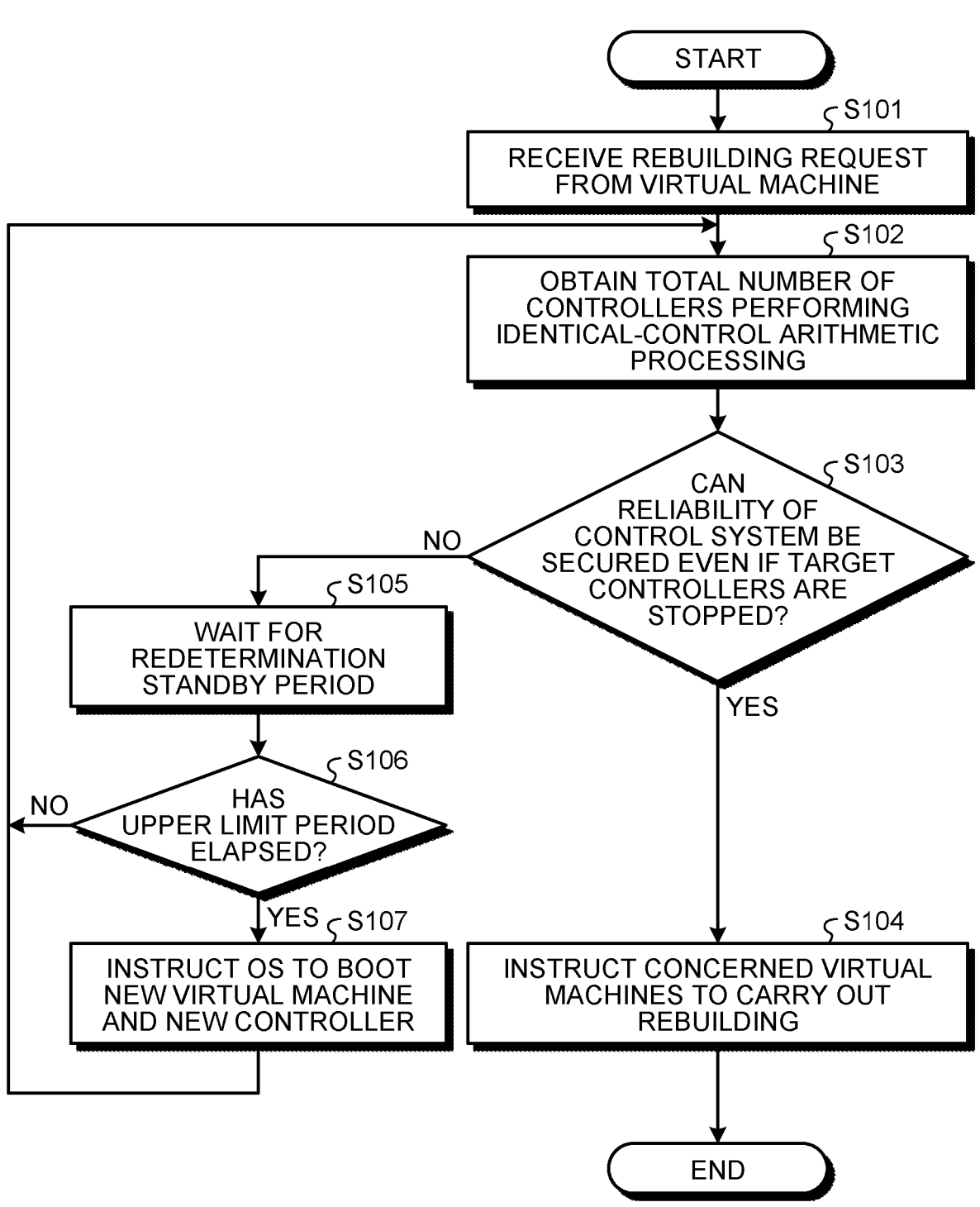
FIG. 2 is a flowchart for explaining a rebuilding operation performed in response to a rebuilding request issued by a virtual machine.

FIG. 2 is a flowchart for explaining a rebuilding operation performed in response to a rebuilding request issued by a virtual machine. Thus, explained below with reference to FIG. 2 is a rebuilding operation performed in response to a rebuilding request issued by any virtual machine 130 in the control device 10 according to the first embodiment.

The application managing unit 170 receives a rebuilding request from one virtual machine 130 (Step S101).

Then, the application managing unit 170 obtains, from the selecting unit 160, the total number of controllers 140 that perform identical-control arithmetic processing (Step S102).

Subsequently, the application managing unit 170 determines whether or not the reliability of the control system 1 can be secured even if one or more the target controllers 140 for rebuilding, which is the source of the rebuilding request, is stopped (Step S103).

If the reliability of the control system 1 can be secured even if one or more the target controllers 140 for rebuilding is stopped (Yes at Step S103), then the application managing unit 170 instructs one or more the virtual machines 130, which runs one or more the target controllers 140 for rebuilding, to carry out the rebuilding (Step S104). Then, the application managing unit 170 ends the rebuilding operation.

On the other hand, if it is difficult to secure the reliability of the control system 1 when one or more the target controllers 140 for rebuilding is stopped (No at Step S103), then the application managing unit 170 waits for the redetermination standby period representing a predetermined period of time (Step S105).

Subsequently, the application managing unit 170 determines whether or not the upper limit period, which is a predetermined period of time longer than the rebooting determination period, has elapsed (Step S106). If the upper limit period has not elapsed (No at Step S106), then the system control returns to Step S102.

On the other hand, if the upper limited period elapses (Yes at Step S106), then the application managing unit 170 instructs the OS 120 to boot a new virtual machine 130 and a new controller 140 (Step S107). Then, the system control returns to Step S102.

Figure 3:
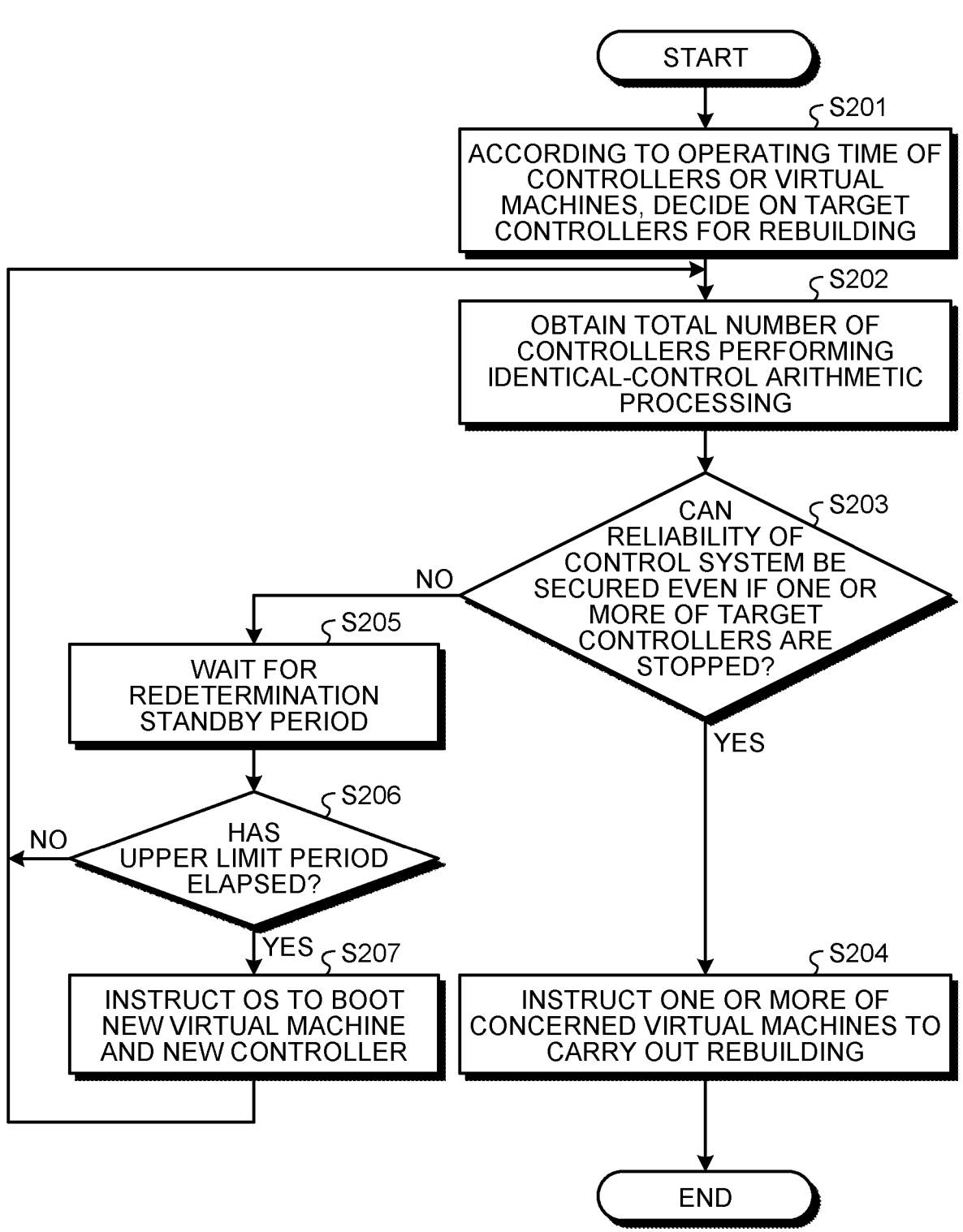
FIG. 3 is a flowchart for explaining a rebuilding operation performed based on the decision taken by an application managing unit about the rebuilding.

FIG. 3 is a flowchart for explaining a rebuilding operation performed based on the decision taken by the application managing unit about the rebuilding. Thus, explained below with reference to FIG. 3 is the flow of a rebuilding operation performed based on the decision taken about the rebuilding by the application managing unit 170 of the control device 10 according to the first embodiment.

According to the operating time of the virtual machines 130 and the controllers 140, the application managing unit 170 decides on the target controllers 140 for rebuilding (Step S201).

Then, the application managing unit 170 obtains, from the selecting unit 160, the total number of controllers 140 that perform identical-control arithmetic processing (Step S202).

Subsequently, the application managing unit 170 determines whether or not the reliability of the control system 1 can be secured even if the target controllers 140 for rebuilding are stopped (Step S203).

If the reliability of the control system 1 can be secured even if the target controllers 140 for rebuilding are stopped (Yes at Step S203), then the application managing unit 170 instructs the virtual machines 130, which run the target controllers 140 for rebuilding, to carry out the rebuilding (Step S204). Then, the application managing unit 170 ends the rebuilding operation.

On the other hand, if it is difficult to secure the reliability of the control system 1 when the target controllers 140 for rebuilding are stopped (No at Step S203), then the application managing unit 170 waits for the redetermination standby period that is a predetermined period of time (Step S205).

Subsequently, the application managing unit 170 determines whether or not the upper limit period, which is a predetermined period of time longer than the rebooting determination period, has elapsed (Step S206). If the upper limit period has not elapsed (No at Step S206), then the system control returns to Step S202.

On the other hand, if the upper limit period has elapsed (Yes at Step S206), then the application managing unit 170 instructs the OS 120 to boot a new virtual machine 130 and a new controller 140 (Step S207). Then, the application managing unit 170 returns to Step S202.

In the first embodiment, when the state of the virtual machines 130 and the controllers 140 satisfies a predetermined condition, the application managing unit 170 decides on the target virtual machines 130 for rebooting. Alternatively, the operation of deciding on the target for rebooting can be performed by each virtual machine 130. In that case, in an identical manner to the prediction of a software error, when the state of the virtual machines 130 and the controllers 140 satisfy a predetermined condition, an instruction for rebooting the target virtual machines 130 for rebooting or the target controllers 140 for rebooting is notified to the application managing unit 170.

For example, each virtual machine 130 determines whether or not the operating time of the corresponding controller 140, which is run by that virtual machine 130, has exceeded an operating time threshold value corresponding to the memory size allocated to the concerned virtual machine 130. If the operating time of the corresponding controller 140 has exceeded the operating time threshold value, then the virtual machine 130 predicts the occurrence of a software error. Subsequently, the virtual machine 130 issues a rebuilding request to the application managing unit 170. In that case, based on the notifications received from the virtual machines 130, the application managing unit 170 decides on the controllers 140 to be rebuilt and performs the determination operation for determining whether or not it is possible to carry out the rebuilding.

Effects

As explained above, the control system 1 according to the first embodiment predicts that the system operations would be affected due to a software error, and treats those controllers 140 regarding which the occurrence of a software error was predicted as the target controllers 140 for rebuilding. Moreover, in the control system 1, if the state of any virtual machines 130 or any controllers 140 satisfies the predetermined condition, then those virtual machines 130 or those controllers 140 are treated as the targets for rebuilding. Then, in the control system 1, it is determined if the reliability of the system can be secured even if the target controllers 140 for rebuilding are stopped and, if the reliability can be secured, the rebuilding of the target virtual machines 130 for rebuilding is carried out.

As a result, in the control system 1, before a software error such as a memory error actually happens, the controllers 140 can be rebuilt in advance, thereby enabling alleviating a decline in the reliability attributed to the termination of control operations caused by the software error. Moreover, in the control system 1, even during the rebuilding of the controllers 140, the reliability can be secured in the form of continuing the control operations. That enables maintaining the reliability in the overall operation of the system, including the normal operations and the rebuilding operation. Thus, it becomes possible to avoid operation instability of applications and to enhance the reliability of the control system 1.

Modification Example

In the first embodiment described above, the explanation is given about the case in which the entire system operates in a single unit of the hardware 110. However, the system configuration is not limited to that case.

For example, the hardware 110 can have a plurality of OSs 120 running therein, and each OS 120 can have one or more virtual machines 130 running therein. Alternatively, there can be a plurality of units of hardware 110, and each unit can have one or more virtual machines 130 running therein. In that case, the selecting unit 160 and the application managing unit 170 of one of the units of hardware 110 can control the selection of the arithmetic values and the rebuilding of the virtual machines 130 across a plurality of units of hardware 110.

Still alternatively, one or more controllers 140 can be configured to be physically independent from the hardware 110. Moreover, there can be some controllers 140 that are run in the hardware 110, and there can be some controllers 140 that are physically independent. Meanwhile, the application managing unit 170 and the selecting unit 160 can be run in the hardware 110 that is different than hardware 110 having the virtual machines 130 and the controllers 140 running therein.

Figure 4:
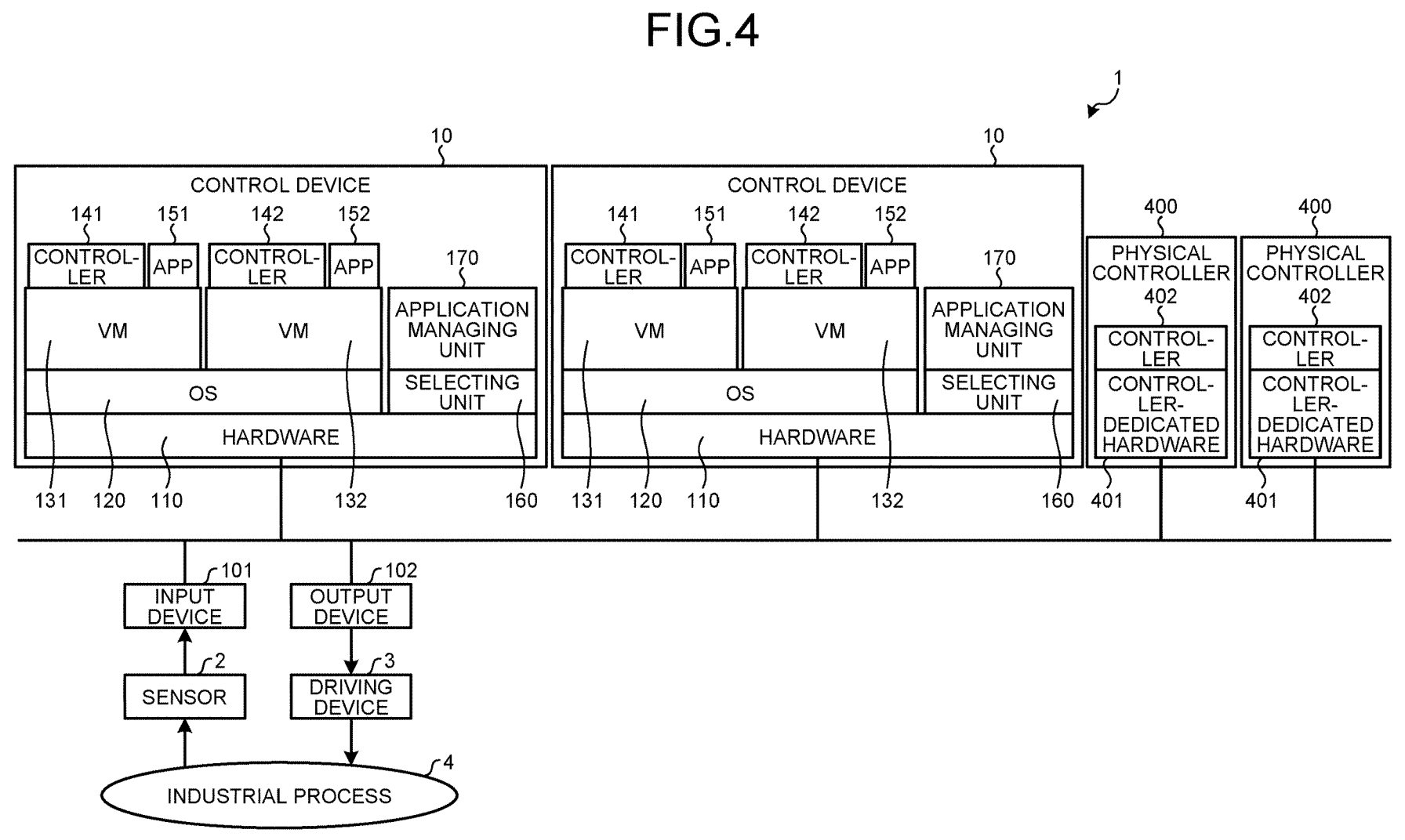

FIG. 4 is a diagram illustrating an exemplary configuration of a control system according to a modification example of the first embodiment. With reference to FIG. 4, the control system 1 includes two control devices 10. Moreover, the control system 1 includes two physical controllers 400 in each of which a controller 402 runs in controller-dedicated hardware 401. The controllers 402 are capable of performing identical-control arithmetic processing as in the case of the controllers 140. Meanwhile, instead of installing the controller 402 in the physical controller 400, it can alternatively be installed in a server in a cloud or a network.

In that case, the selecting unit 160 and the application managing unit 170 of either one of the two control devices 10 can select the arithmetic values of the controllers 140 and 402 and can carry out the rebuilding of all virtual machines 130. Alternatively, if the controllers 140 and 402 are divided into a plurality of groups in which different types of identical-control arithmetic processing is performed, then the selecting unit 160 and the application managing unit 170 can be assigned on a group-by-group basis.

Meanwhile, if the virtual machine 130 that has the target controller 140 for rebuilding running therein is run in the OS 120 that is different than the OS for the other virtual machines 130, then the rebuilding of that controller 140 can include rebooting of the OS 120, post-shut-down rebooting of the OS 120, and reinstallation of the OS 120.

Second Embodiment

Given below is the explanation of a second embodiment. The control device 10 according to the second embodiment too is illustrated in the block diagram in FIG. 1. The control device 10 according to the second embodiment identifies the controllers 140 that are performing peculiar operations and issues a rebuilding request. In the following explanation, regarding the operations of the constituent elements that are identical to the first embodiment, the explanation is not given again.

The selecting unit 160 receives an arithmetic value from each controller 140. Then, according to the received arithmetic values, the selecting unit 160 identifies the controllers 140 that are performing peculiar operations. Subsequently, the selecting unit 160 outputs, to the application managing unit 170, a rebuilding request for rebuilding the identified controllers 140 that are performing peculiar operations.

For example, from among a plurality of controllers 140 performing identical-control arithmetic processing, if the arithmetic processing results of particular controllers 140 are different, then the selecting unit 160 identifies those controllers 140 as the controllers 140 performing peculiar operations. Herein, if an arithmetic processing result is different either for only one time or for a plurality of times, the selecting unit 160 can determine that the arithmetic processing result of that particular controller 140 is different. Alternatively, either if an arithmetic processing result is successively different for a predetermined number of times or if the total number of times for which an arithmetic processing result is different reaches a predetermined count, the selecting unit 160 can determine that the arithmetic processing result of that particular controller 140 is different.

Alternatively, for example, if the design is such that the arithmetic processing results are received within a specific range of time, when the arithmetic processing result from a particular controller 140 is delayed by a specific period of time or more, then the selecting unit 160 identifies that controller 140 as the controller 140 performing peculiar operations. That is because, the processing capacity of the controllers 140 is believed to undergo a decline due to, for example, a memory leak. Hence, the selecting unit 160 identifies, as the controller 140 performing peculiar operations, a particular controller 140 from which the reception of the arithmetic processing result is delayed by a specific period of time or more. Herein, since there is a possibility that the arithmetic results from a plurality of applications reach the selecting unit 160 at mutually different timings, the selecting unit 160 can be equipped with a function of waiting for a certain period of time for the arrival of the arithmetic processing results.

Still alternatively, the selecting unit 160 can identify, as the controllers 140 performing peculiar operations, the controllers 140 that output the arithmetic values which were not selected from among the arithmetic values obtained as a result of identical-control arithmetic processing.

In this way, based on the arithmetic processing results received from the controllers 140 that represent applications, the selecting unit 160 detects malfunctioning of the controllers 140.

Meanwhile, the virtual machines 130 can also be configured to identify the controllers 140 performing peculiar operations. For example, as the monitoring result of the general operating state, each virtual machine 130 detects such malfunctioning, such as the CPU load or the network abnormality, which reoccurs due to the rebooting of the virtual machine 130; and determines that the operations of the corresponding controller 140 are of a peculiar nature. Then, the virtual machine 130 issues a rebuilding request to the application managing unit 170.

The application managing unit 170 receives, from the selecting unit 160, a rebuilding request for each controller 140 performing peculiar operations. Then, as the target controllers 140 for rebuilding, the application managing unit 170 treats the controllers 140 specified to perform peculiar operations, and determines whether or not it is possible to carry out the rebuilding. If it is possible to carry out the rebuilding, then the application managing unit 170 issues a rebuilding instruction to the virtual machines 130 that run the specified controllers 140 performing peculiar operations.

Meanwhile, the application managing unit 170 can receive a rebuilding request from each virtual machine 130 which has determined that the controller 140 run by it performs peculiar operations. Then, as the target controller 140 for rebuilding, the application managing unit 170 treats the controller 140 run by the virtual machine 130 which sent the rebuilding request. Subsequently, the application managing unit 170 determines whether or not it is possible to carry out the rebuilding. If it is possible to carry out the rebuilding, then the application managing unit 170 issues a rebuilding instruction to the virtual machine 130 that runs the controller 140 performing peculiar operations.

In this way, the application managing unit 170 treats, as the target controllers 140 for rebuilding, the controllers 140 performing peculiar operations as detected by the selecting unit 160; determines whether or not the reliability can be secured according to the arithmetic processing performed by the other controllers 140 other than the target controllers 140 for rebuilding; and, if the reliability can be secured, carries out the rebuilding of the target controllers 140 for rebuilding.

As explained above, in the control system 1 according to the second embodiment, the controllers 140 performing peculiar operations is identified, and the virtual machines 130 that run the identified controllers 140 are rebuilt. As a result, any controller 140 having operation instability, apart from a software error, that is likely to affect the operations of the control system 1 can be rebuilt before the actual occurrence of malfunctioning. As a result, it becomes possible to enhance the reliability of the control system 1.

System

The processing procedures, the control procedures, specific names, various data, and information including parameters described in the embodiments or illustrated in the drawings can be changed as required unless otherwise specified.

The constituent elements of the device illustrated in the drawings are merely conceptual, and need not be physically configured as illustrated. The constituent elements, as a whole or in part, can be separated or integrated either functionally or physically based on various types of loads or use conditions.

The process functions implemented in the device are entirely or partially implemented by a CPU or by computer programs that are analyzed and executed by a CPU, or are implemented as hardware by wired logic.

Hardware

Figure 5:
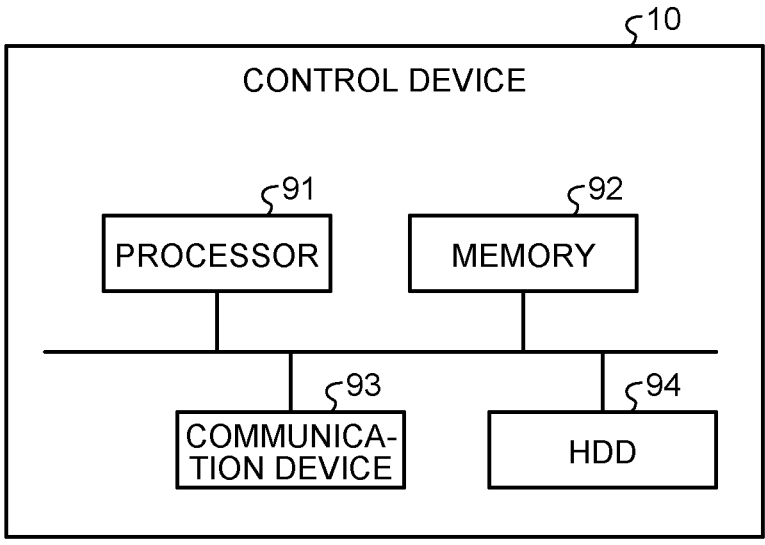
FIG. 5 is a hardware configuration diagram of a control device.

Given below is the explanation of an exemplary hardware configuration of the control device 10. FIG. 5 is a hardware configuration diagram of the control device. As illustrated in FIG. 5, the control device 10 includes a processor 91, a memory 92, a communication device 93, and a hard disk drive (HDD) 94. The processor 91, the memory 92, the communication device 93, and the HDD 94 represent an example of the hardware 110 illustrated in FIG. 1. The processor 91 is connected to the memory 92, the communication device 93, and the HDD 94 via a bus.

The communication device 93 is a network interface used in communicating with other information processing devices. For example, when a plurality of control devices 10 is present, the communication device 93 relays the communication among the processors 91 of different control devices 10.

The HDD 94 is an auxiliary storage device. The HDD 94 is used to store various computer programs including the computer programs written for implementing the functions of the OS 120, the virtual machines 131 to 133, the controllers 141 to 143, the applications 151 to 153, the selecting unit 160, and the application managing unit 170 illustrated in FIG. 1.

The processor 91 loads various computer programs, which are stored in the HDD 94, in the memory 92, and executes them. As a result, the processor 91 implements the functions of the OS 120, the virtual machines 131 to 133, the controllers 141 to 143, the applications 151 to 153, the selecting unit 160, and the application managing unit 170 illustrated in FIG. 1.

In this way, as a result of reading and executing computer programs, the control device 10 functions as an information processing device that implements various processing methods. Alternatively, the control device 10 can read the computer programs from a recording medium using a medium reading device, execute the read computer programs, and implement the functions identical to the embodiments described above. Meanwhile, the computer programs mentioned here are not limited to be executed by the control device 10. For example, even when the computer programs are executed by some other computer, or by a server, or by such devices in cooperation; the present invention can be implemented in an identical manner.

Still alternatively, the computer programs can be distributed via a network such as the Internet. Still alternatively, the computer programs can be recorded in a computer-readable recording medium such as a hard disk, a flexible disk (FD), a compact disc read only memory (CD-ROM), a magneto-optical (MO) disk, or a digital versatile disc. Then, a computer can read the computer programs from the recording medium and execute them.

According to an aspect of the present invention, it becomes possible to avoid operation instability of the applications, and to enhance the reliability of the control system.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

A few exemplary combinations of the technological features disclosed herein are given below.

(1) A control device including:

a selecting unit that selects and outputs an arithmetic processing result based on arithmetic processing results output from a plurality of applications performing predetermined arithmetic processing; and an application managing unit that selects one or more of the applications as target applications for rebuilding, determines whether or not reliability of output of the selecting unit is securable according to arithmetic processing performed by the applications other than the target applications for rebuilding, and when the reliability is securable, carries out rebuilding of the target applications for rebuilding.

(2) The control device according to (1), wherein each of the applications performs identical-control arithmetic processing as the predetermined arithmetic processing, the identical-control arithmetic processing being commonly performed by each of the applications, and the selecting unit selects the arithmetic processing result using a majority logic with respect to the arithmetic processing result.

(3) The control device according to (2), wherein, when number of the applications other than the target applications for rebuilding is equal to or greater than number of the applications that enable securing reliability of output according to the majority logic implemented by the selecting unit, the application managing unit determines that the reliability is securable.

(4) The control device according to any one of (1) to (3), wherein the application managing unit determines, based on operating state of the applications, whether or not to rebuild each of the applications, determines whether or not the reliability is securable according to arithmetic processing performed by the applications other than the target applications for rebuilding, and when the reliability is securable, carries out rebuilding of the target applications for rebuilding.

(5) The control device according to any one of (1) to (4), wherein based on arithmetic processing result received from each of the applications, the selecting unit detects malfunctioning of the applications, and the application managing unit treats, as target application for rebuilding, the application in which malfunctioning is detected by the selecting unit, determines whether or not reliability of output of the selecting unit is securable according to arithmetic processing performed by the applications other than the target application for rebuilding, and when the reliability is securable, carries out rebuilding of the target application for rebuilding.

(6) The control device according to any one of (1) to (5), wherein the application managing unit rebuilds the target applications for rebuilding by stopping and booting the target applications for rebuilding or by reinstalling the target applications for rebuilding.

(7) The control device according to any one of (1) to (6), wherein the application managing unit performs control in such a way that number of the applications which are running is equal to or greater than a number of applications enabling securing reliability of output of the selecting unit during rebuilding.

(8) The control device according to (1) to (7), wherein when output from a new application is received, the application managing unit increments, by one, number of applications performing the predetermined arithmetic processing and determines whether or not reliability of output from the selecting unit is securable, and when malfunctioning of the applications is detected, the selecting unit decrements, by one, number of applications performing the predetermined arithmetic processing, and determines whether or not reliability of output from the selecting unit is securable.

(9) The control device according to any one of (1) to (8), wherein the application managing unit varies determination logic, which is about determining whether or not reliability of output from the selecting unit is securable, according to reliability required from the predetermined arithmetic processing performed by the applications.

(10) The control device according to any one of (1) to (9), wherein the application managing unit decides on the target applications for rebuilding based on operating time of the applications.

(11) The control device according to any one of (1) to (10), wherein the applications perform the predetermined arithmetic processing for calculating control value with respect to an industrial process.

(12) A control system including:

an input device that receives input of measurement result from a sensor installed in a plant facility;

an output device that drives a driving device meant for driving a mechanism installed in the plant facility; and a control device, wherein the control device includes a plurality of virtual machines each of which runs an application for performing predetermined arithmetic processing based on measurement result obtained by the sensor and input in the input device, a selecting unit that selects an arithmetic processing result based on arithmetic processing results output from the applications, and causes the output device to output the selected arithmetic processing result and to drive the driving device, and an application managing unit that selects one or more of the applications as target applications for rebuilding, determines whether or not reliability of output of the selecting unit is securable according to arithmetic processing performed by the applications other than the target applications for rebuilding, and when the reliability is securable, carries out rebuilding of the target applications for rebuilding.

(13) A control method that causes a control device to perform:

running a plurality of applications performing predetermined arithmetic processing;

selecting and outputting an arithmetic processing result based on arithmetic processing results output from the plurality of applications;

determining that includes selecting one or more of the applications as target applications for rebuilding, determining whether or not reliability of output of the arithmetic processing result is securable according to arithmetic processing result obtained by the applications other than the target applications for rebuilding, and when the reliability is securable, carrying out rebuilding of the target applications for rebuilding.

(14) A computer-readable recording medium having stored therein a control program that causes the computer to execute a process including:

running a plurality of applications performing predetermined arithmetic processing;

selecting and outputting an arithmetic processing result based on arithmetic processing results output from the plurality of applications;

determining that includes selecting one or more of the applications as target applications for rebuilding, determining whether or not reliability of output of the arithmetic processing result is securable according to arithmetic processing result obtained by the applications other than the target applications for rebuilding, and when the reliability is securable, carrying out rebuilding of the target applications for rebuilding.

What is claimed is:

1. A control device comprising:

a selecting unit that selects and outputs an arithmetic processing result based on arithmetic processing results output from a plurality of applications performing predetermined arithmetic processing; and an application managing unit that selects one or more of the applications as target applications for rebuilding, determines whether or not reliability of output of the selecting unit is securable according to arithmetic processing performed by the applications other than the target applications for rebuilding, and when the reliability is securable, carries out rebuilding of the target applications for rebuilding.

2. The control device according to claim 1, wherein each of the applications performs identical-control arithmetic processing as the predetermined arithmetic processing, the identical-control arithmetic processing being commonly performed by each of the applications, and the selecting unit selects the arithmetic processing result using a majority logic with respect to the arithmetic processing result.

3. The control device according to claim 2, wherein, when number of the applications other than the target applications for rebuilding is equal to or greater than number of the applications that enable securing reliability of output according to the majority logic implemented by the selecting unit, the application managing unit determines that the reliability is securable.

4. The control device according to claim 1, wherein the application managing unit determines, based on operating state of the applications, whether or not to rebuild each of the applications, determines whether or not the reliability is securable according to arithmetic processing performed by the applications other than the target applications for rebuilding, and when the reliability is securable, carries out rebuilding of the target applications for rebuilding.

5. The control device according to claim 1, wherein based on arithmetic processing result received from each of the applications, the selecting unit detects malfunctioning of the applications, and the application managing unit treats, as target application for rebuilding, the application in which malfunctioning is detected by the selecting unit, determines whether or not reliability of output of the selecting unit is securable according to arithmetic processing performed by the applications other than the target application for rebuilding, and when the reliability is securable, carries out rebuilding of the target application for rebuilding.

6. The control device according to claim 1, wherein the application managing unit rebuilds the target applications for rebuilding by stopping and booting the target applications for rebuilding or by reinstalling the target applications for rebuilding.

7. The control device according to claim 1, wherein the application managing unit performs control in such a way that number of the applications which are running is equal to or greater than a number of applications enabling securing reliability of output of the selecting unit during rebuilding.

8. The control device according to claim 1, wherein when output from a new application is received, the application managing unit increments, by one, number of applications performing the predetermined arithmetic processing and determines whether or not reliability of output from the selecting unit is securable, and when malfunctioning of the applications is detected, the selecting unit decrements, by one, number of applications performing the predetermined arithmetic processing, and determines whether or not reliability of output from the selecting unit is securable.

9. The control device according to claim 1, wherein the application managing unit varies determination logic, which is about determining whether or not reliability of output from the selecting unit is securable, according to reliability required from the predetermined arithmetic processing performed by the applications.

10. The control device according to claim 1, wherein the application managing unit decides on the target applications for rebuilding based on operating time of the applications.

11. The control device according to claim 1, wherein the applications perform the predetermined arithmetic processing for calculating control value with respect to an industrial process.

12. A control system comprising:

an input device that receives input of measurement result from a sensor installed in a plant facility;

an output device that drives a driving device meant for driving a mechanism installed in the plant facility; and a control device, wherein the control device includes a plurality of virtual machines each of which runs an application for performing predetermined arithmetic processing based on measurement result obtained by the sensor and input in the input device, a selecting unit that selects an arithmetic processing result based on arithmetic processing results output from the applications, and causes the output device to output the selected arithmetic processing result and to drive the driving device, and an application managing unit that selects one or more of the applications as target applications for rebuilding, determines whether or not reliability of output of the selecting unit is securable according to arithmetic processing performed by the applications other than the target applications for rebuilding, and when the reliability is securable, carries out rebuilding of the target applications for rebuilding.

13. A control method that causes a control device to perform steps of:

running a plurality of applications performing predetermined arithmetic processing;

selecting and outputting an arithmetic processing result based on arithmetic processing results output from the plurality of applications;

determining that includes selecting one or more of the applications as target applications for rebuilding, determining whether or not reliability of output of the arithmetic processing result is securable according to arithmetic processing result obtained by the applications other than the target applications for rebuilding, and when the reliability is securable, carrying out rebuilding of the target applications for rebuilding.

14. A non-transitory computer-readable recording medium having stored therein a control program that causes the computer to execute the steps included in the control method according to claim 13.

\* \* \* \* \*